United States Patent [19]

Aylott et al.

[11] Patent Number: 4,738,246
[45] Date of Patent: Apr. 19, 1988

[54] LID FOR A DEEP-FRYING PAN

[76] Inventors: Alfred W. T. Aylott, 21 Napier Road, Stratford, London E. 15; Richard D. Moore, 2 Maytrees, Loom Lane, Radlett, Herts., both of England

[21] Appl. No.: 896,219

[22] Filed: Aug. 14, 1986

[30] Foreign Application Priority Data

Aug. 14, 1985 [GB] United Kingdom ............... 8520389
Jun. 2, 1986 [GB] United Kingdom ............... 8613323

[51] Int. Cl.⁴ .................. A47J 27/00; F24H 1/00
[52] U.S. Cl. ........................... 126/373; 126/384; 99/447
[58] Field of Search ............. 126/389, 373, 384, 385, 126/386, 387; 131/240.1, 242; 220/1 H; 99/447; 55/384

[56] References Cited

U.S. PATENT DOCUMENTS

| | | | |
|---|---|---|---|
| 1,351,142 | 8/1920 | Tomaszak | 126/381 |
| 2,029,342 | 2/1936 | Schultz | 220/1 H |
| 2,044,377 | 6/1936 | Bashur | 131/242 |
| 2,440,387 | 4/1948 | Weddle | 131/242 |
| 2,786,595 | 3/1957 | Nelson | 220/1 H |
| 3,452,895 | 7/1969 | Kalkowski | 55/384 |
| 3,904,070 | 9/1975 | Lisciani et al. | 220/1 H |

FOREIGN PATENT DOCUMENTS

| | | |
|---|---|---|
| 1170983 | 1/1959 | France . |
| 385448 | 12/1984 | Switzerland . |
| 220083 | 2/1924 | United Kingdom . |
| 678824 | 9/1952 | United Kingdom . |

Primary Examiner—James C. Yeung
Attorney, Agent, or Firm—Schwartz, Jeffery, Schwaab, Mack, Blumenthal & Evans

[57] ABSTRACT

A lid for a deep frying pan consists of a side wall adapted to fit on to the side wall of the pan and a baffle wall and a second wall extending inwardly of the side wall; the baffle wall has a re-entrant neck portion extending towards the baffle wall and the walls define a chamber in the lid around the neck portion.

An opening leading to the chamber surrounds the opening in the neck portion and an aperture in the baffle wall provides access to both the opening in the neck portion and to the chamber. Gases accumulated in the chamber flow across the opening in the neck portion to cut off the supply of air to the pan.

8 Claims, 4 Drawing Sheets

LID FOR A DEEP-FRYING PAN

BACKGROUND OF THE INVENTION

The present invention relates to a lid for a container in which cooking oil is heated and, in particular, though not exclusively, to a lid for a domestic deep frying pan, commonly known as a "chip fryer" or a "chip pan".

One of the presisting fire hazards in domestic kitchens is the deep frying pan. Such pans contain a considerable quantity of volatile and potentially inflammable cooking oil which, when overheated, expands rapidly to form a large combustible gaseous mass which readily ignites.

It is clearly desirable to reduce the hazard from such deep frying pans but heretofore alternative proposals to the construction of the deep frying pan itself have been forthcoming and, although these new pans may be safer than existing pans, there are a very large number of existng pans which need to be made safer.

SUMMARY OF THE INVENTION

Accordingly, the present invention resides in a lid for fitting on to a conventional deep frying pan or the like, said lid comprising a side wall arranged to fit on to the side wall of a deep frying pan or the like; a baffle wall extending inwardly of the side wall, and a second wall extending inwardly of the side wall and having a re-entrant neck portion extending in the direction towards the baffle wall; said walls defining a fume chamber around the neck portion with an opening to the fume chamber adjacent an opening through the adjacent end of the neck portion; and said baffle wall defining an aperture which provides access both to the opening through the neck portion and to the chamber.

In use, the lid is fitted on to the deep frying pan and the lid allows air flow between the inside of the pan and the atmosphere through the open neck portion unless and until excess gas rising from the pan enters into the fume chamber in the lid through the aperture in the baffle wall and in returning out of the chamber flows across the opening at the adjacent end of the neck portion to restrict the air flow through the neck portion. In the event of the volatile oil in the pan reaching the point of combustion, the gases formed expand rapidly and fill the chamber in the lid and return from the chamber to form a shroud across the opening of the neck portion cutting off the oxygen supply and extinguishing any flames in the pan.

The side wall and the periphery of the baffle wall are preferably of the same cross-section so that the baffle wall is a push fit within the side wall. The plane containing the aperture in the baffle wall may be spaced apart from the plane containing the inner end of the neck portion or, alternatively, the two planes may be co-planar.

The aperture in the baffle wall may be covered by a wire gauze.

BRIEF DESCRIPTION OF THE DRAWINGS

In order that the invention may be more readily understood, it will now be described, by way of preferred embodiments, with reference to the accompanying drawings, in which.

DETAILED DESCRIPTION OF THE PREFERRED EMBODIMENTS

Figure 1:
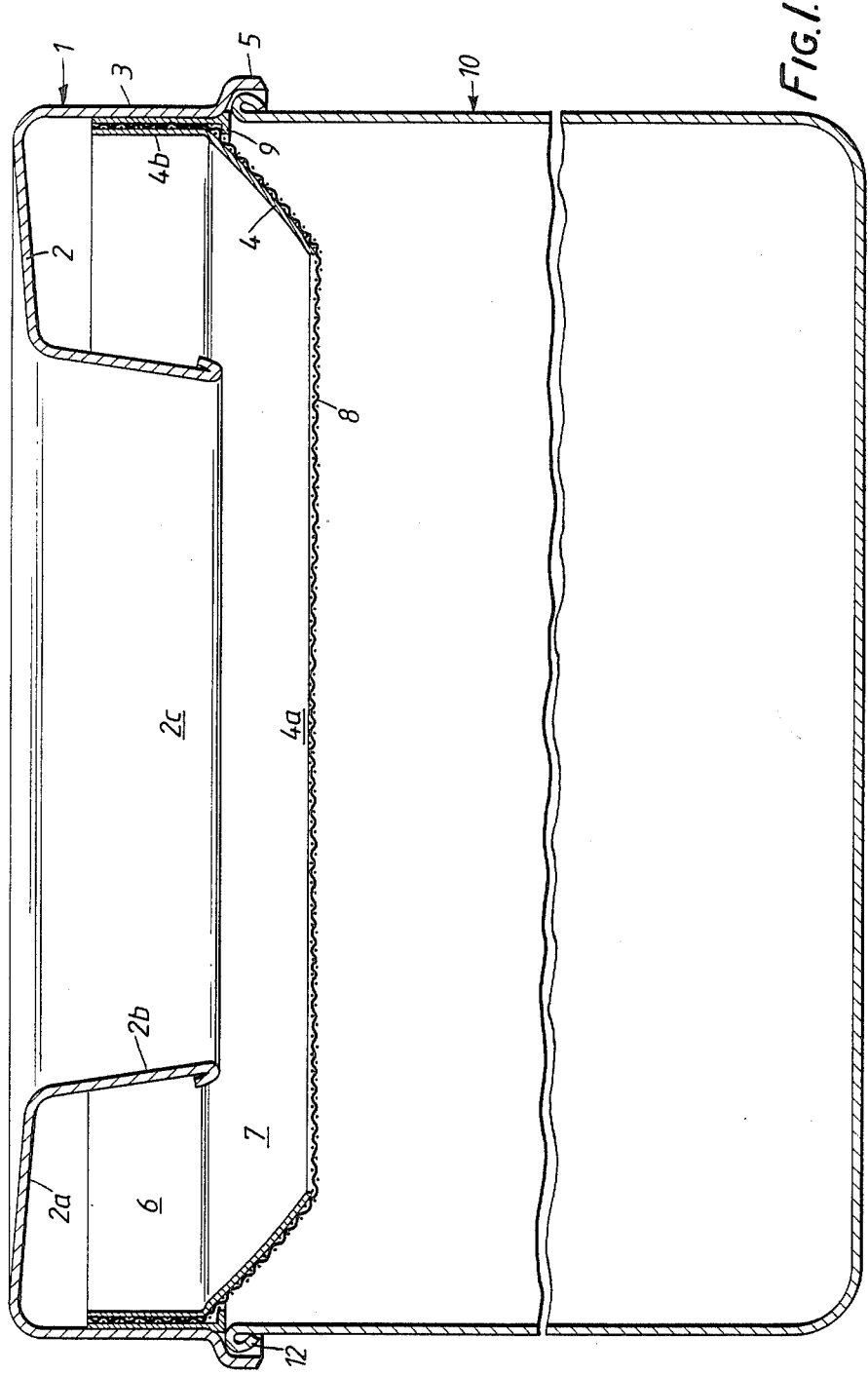
FIG. 1 is a sectional view of a lid according to one embodiment of the invention, with the lid fitted on to a pan.
Figure 2:
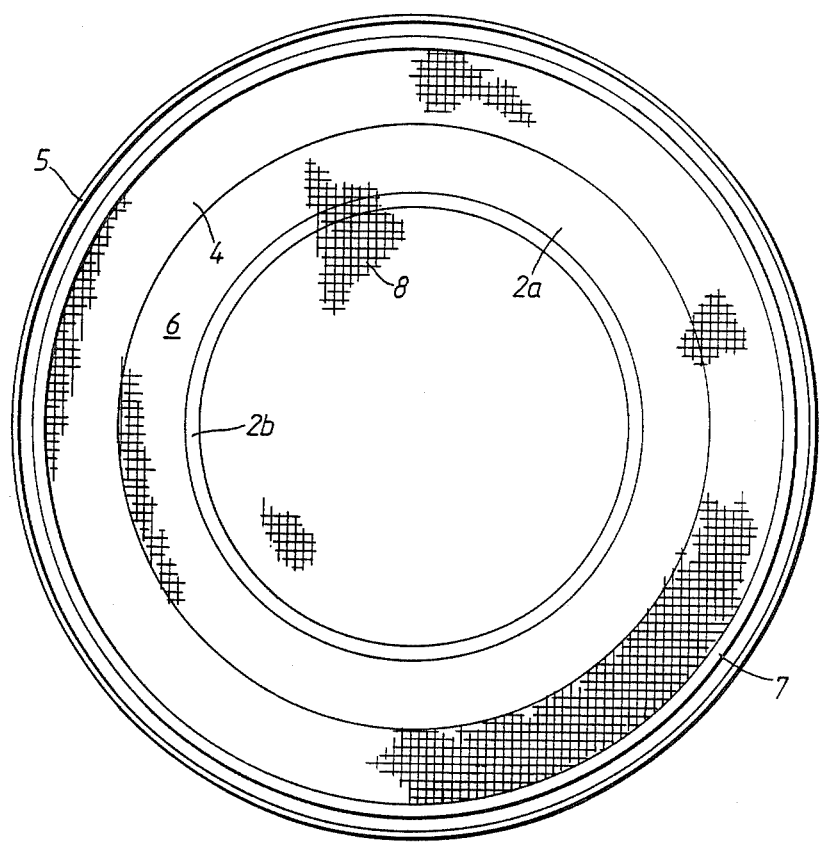
FIG. 2 is a plan view from beneath the lid.

A pan for deep frying food and in which a quantity of cooking oil is heated is indicated by reference numeral 10. The pan is conveniently of cylindrical form with its side wall having a turned-over upper edge 12. A lid for fitting on to the pan is indicated in FIGS. 1 and 2 by reference numeral 1 and comprises an upper wall 2, a cylindrical side wall 3 and inwardly projecting baffle wall 4. The upper wall 2 has two main parts: an outer annular part 2a and a central re-entrant neck portion 2b which terminates in an opening 2c. The side wall 3 has an annular rim or lip 5 which enables the side wall to fit on to the edge 12 of the pan. The lower baffle wall 4 projects inwardly from the cylindrical side wall 3 below the neck portion 2b of the upper wall and has a central aperture 4a about the neck portion 2b adjacent and below the opening 2c in the end of the neck portion. The upper wall, side wall and baffle wall define a fume chamber 6 in the lid around the re-entrant neck portion. An opening 7 leading to the fume chamber is adjacent the opening 2c of the neck portion.

A metal gauze 8 is stretched across the opening 4a in the baffle wall and the edge of the gauze lies between a part 4b of the baffle wall and a ring 9 which is a force-fit between the part 4b and the wall 3 of the lid.

The lid is usually made entirely of metal and the baffle wall can be formed as one piece and the wire gauze fixed to the baffle wall rather than trapped between the baffle and the ring 9, as illustrated.

It will be appreciated that the actual size of the neck opening 2c and the baffle aperture 4a will vary with the size of the pan lid. The ratio of the area of the neck opening to the baffle opening can also vary but the aperture in the baffle is larger than the opening in the neck portion and, in the embodiment illustrated, the ratio of the area of the neck opening to the area of the baffle opening is approximately 1 to 2.85. The opening in the baffle thus provides access to the opening in the neck portion and to the fume chamber 6.

In use, when fitted to a deep frying pan, vapour gases, etc. will rise from the pan and, in normal circumstances, pass through the gauze to the atmosphere via the open end 2c of the neck portion. However, should excess gas vapour, etc. rise from the contents of the pan due, for example, to overheating, those gases, etc. will in part after penetrating the gauze pass through the opening 7 into the fume chamber 6 in the lid. These expanding gases flow out of the chamber and across the opening 2c in the end of the neck portion to cut off the air flow to the inside of the pan, thus preventing combustion or further combustion of the contents of the pan. The gauze acts to further reduce the risk of fire by slowing and restricting the expansion of the volatile gases without forming a closed barrier which might prove dangerous. While the gauze is not essential, it is preferable.

Figure 3:
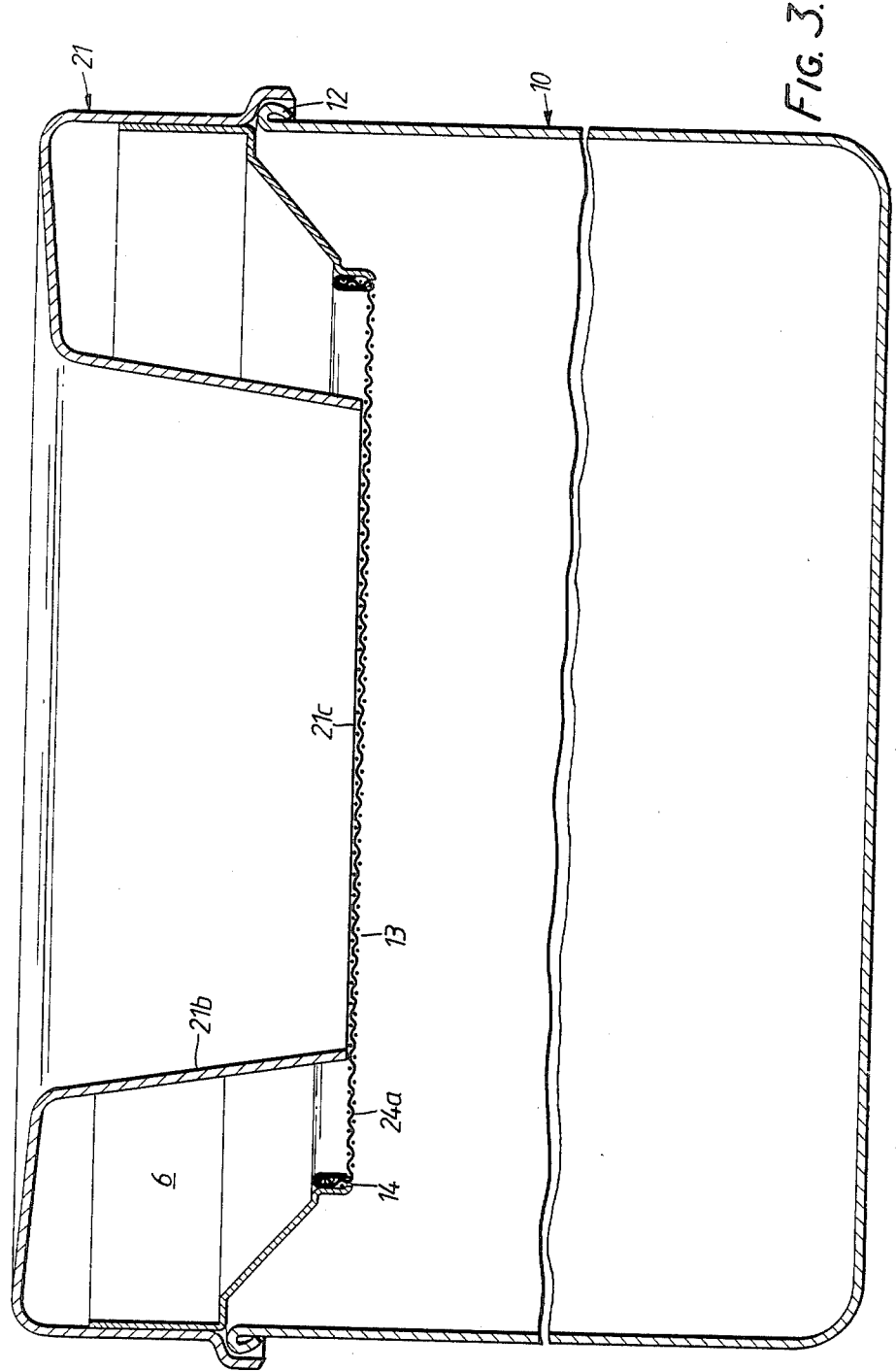
FIG. 3 is a sectional elevation of a lid according to an alternative embodiment of the invention fitted on to a pan.
Figure 4:
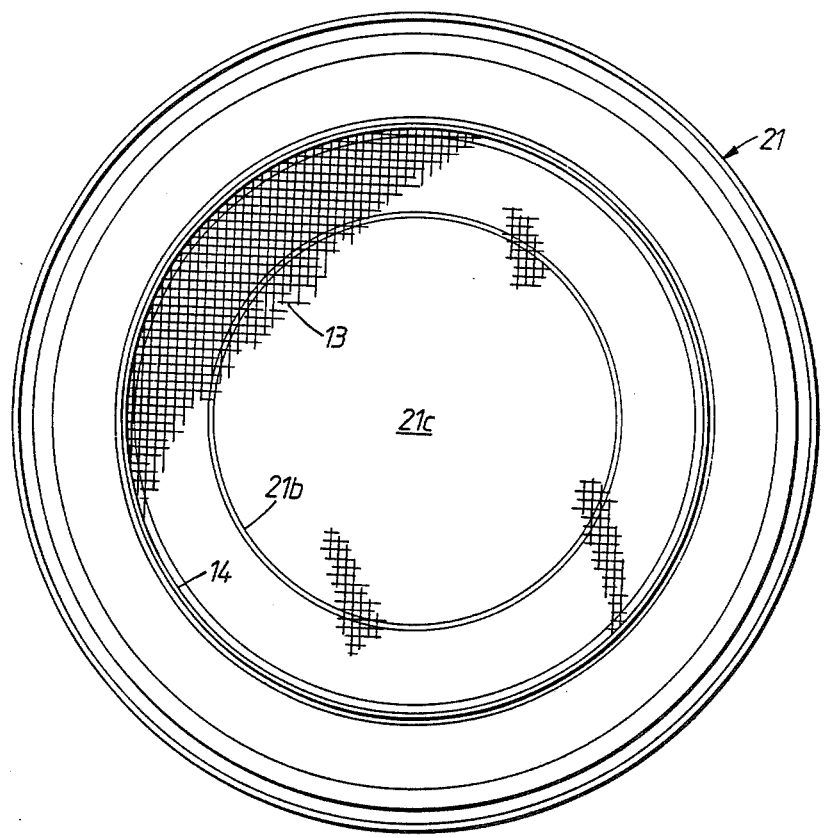
FIG. 4 is a bottom view of the lid shown in FIG. 3.

In the arrangement shown in FIGS. 3 and 4 of the drawings, the lid 21 has a re-entrant neck portion 21b which extends further into the pan than that of the arrangement shown in FIGS. 1 and 2. The plane containing the opening 21c at the end of the neck portion and the plane containing the aperture 24a in the baffle are substantially co-planar. A gauze 13 is bounded by a stiffened outer edge 14 which enables it to be a push-fit into the aperture in the baffle wall. Again, in this embodiment, the cross-section of the aperture in the baffle wall is larger than the opening in the re-entrant neck portion so that the aperture in the baffle wall provides access to the fume chamber 6 as well as to the opening in the neck portion.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

We claim:

1. A deep frying apparatus for cooking with oil, comprising:
   a pan having side walls and a bottom wall;
   a lid fitted on the side walls of the pan comprising:
   an annular body comprising a generally vertical side wall, an upper wall comprising an annular part extending generally radially inwardly from an upper portion of said side wall, and a re-entrant neck portion extending generally downwardly from a radially inner portion of said annular part and defining an axial opening in the lid;
   means for directing gasses from within the annular body across the axial opening comprising a solid baffle wall connected on its outer edge to the side wall and extending inwardly from the side wall of the annular body and being spaced below the upper wall such that the side wall, upper wall, neck portion and baffle wall define an annular fume chamber; and
   wherein said baffle wall terminates at a point spaced a distance radially outwardly from the neck portion to define an annular opening in the annular fume chamber, the radial distance between the termination point of said baffle wall and said neck portion being large enough to provide said annular opening with a size sufficient to permit gasses to both enter and exit the annular fume chamber through said annular opening when superheated oil along the side walls of the container rapidly expands to fill the annular chamber, the annular opening being adjacent the axial opening so that gasses exiting the fume chamber create a shroud across the axial opening and cut off the oxygen supply to the pan.

2. The deep frying apparatus as claimed in claim 1, further comprising a wire gauze attached to the baffle wall and extending across the annular and axial openings.

3. The lid as claimed in claim 2, wherein the inner edge of the baffle wall is substantially co-planar with a plane containing the lower edge portion of the neck portion.

4. The lid as claimed in claim 2, wherein said annular chamber is generally rectangular in cross-sectional form.

5. The deep frying apparatus as claimed in claim 1 wherein the area of the axial opening is large relative to the area defined by the side wall of the pan.

6. The deep frying apparatus as claimed in claim 5 wherein the point at which said baffle wall terminates defines a baffle opening and the ratio of the area of the axial opening to the area of the baffle opening is about 1:2.85.

7. The lid as claimed in claim 1, wherein the side wall portion and the baffle wall have approximately equal diameters and the baffle wall is pushfitted within the side wall portion.

8. The lid as claimed in claim 1, wherein the inner edge of the baffle wall is spaced apart from a plane containing the lower edge portion of the neck portion.

* * * * *